(12) United States Patent
Theilig et al.

(10) Patent No.: US 7,883,157 B2
(45) Date of Patent: Feb. 8, 2011

(54) METHOD FOR PRODUCING A RIM RING, METHOD FOR FASTENING SPOKES, RIM RING, WIRED-ON WHEEL RIM AND BICYCLE

(75) Inventors: Simon Theilig, Friedrichshafen (DE); Thomas Leschik, Friedrichshafen (DE)

(73) Assignee: Carbonsports GmbH, Friedrichshafen (DE)

( * ) Notice: Subject to any disclaimer, the term of this patent is extended or adjusted under 35 U.S.C. 154(b) by 83 days.

(21) Appl. No.: 12/198,399

(22) Filed: Aug. 26, 2008

(65) Prior Publication Data

US 2009/0079257 A1    Mar. 26, 2009

(30) Foreign Application Priority Data

Aug. 29, 2007   (DE) .................. 10 2007 042 198

(51) Int. Cl.
*B60B 5/02*    (2006.01)
(52) U.S. Cl. .............................. 301/64.704; 301/95.103
(58) Field of Classification Search .................. 301/55, 301/58, 64.102, 64.704, 64.705, 66–67, 95.101, 301/95.102, 95.103, 95.107, 104; 152/382–383
See application file for complete search history.

(56) References Cited

U.S. PATENT DOCUMENTS

| 4,835,857 A | * | 6/1989 | Michelotti | ............. | 29/894.321 |
|---|---|---|---|---|---|
| 4,844,552 A | * | 7/1989 | Tsygankov et al. | .... | 301/64.702 |
| 4,919,490 A | * | 4/1990 | Hopkins et al. | ........ | 301/64.702 |
| 5,080,444 A | * | 1/1992 | Hopkins et al. | ........ | 301/95.107 |
| 5,184,874 A | | 2/1993 | Olson et al. | | |
| 5,249,846 A | * | 10/1993 | Martin et al. | .......... | 301/95.102 |
| 5,540,485 A | * | 7/1996 | Enders | ....................... | 301/104 |
| 5,564,793 A | * | 10/1996 | Whiteford | .............. | 301/64.703 |
| 5,915,796 A | * | 6/1999 | Beyer | .......................... | 301/59 |
| 5,975,645 A | * | 11/1999 | Sargent | ................... | 301/95.11 |
| 6,086,161 A | * | 7/2000 | Luttgeharm et al. | .... | 301/95.102 |
| 6,398,313 B1 | * | 6/2002 | Lew | ...................... | 301/95.102 |

FOREIGN PATENT DOCUMENTS

DE   44 25 592 A1   1/1996
EP    1 231 077 A2   8/2002

* cited by examiner

*Primary Examiner*—Jason R Bellinger
(74) *Attorney, Agent, or Firm*—Beyer Law Group LLP (57) ABSTRACT

The present invention relates to a method for producing a rim ring for a wheel rim, in particular for a wired-on wheel rim, with the following steps: providing an outer rim profile made of hardened composite fibrous material, providing a plastic shaping element, providing at least one top layer made of composite fibrous material, inserting the plastic shaping element radially within the outer rim profile, and positioning the top layer relative to the plastic shaping element and to the outer rim profile such that at least part of the top layer extends from the plastic shaping element onto the outside of the outer rim profile. The present invention further relates to a method for fastening spokes made of composite fibrous material to a rim ring. Finally, the present invention also relates to a rim ring, a wired-on wheel rim and a bicycle with wired-on wheel rims.

19 Claims, 6 Drawing Sheets

METHOD FOR PRODUCING A RIM RING, METHOD FOR FASTENING SPOKES, RIM RING, WIRED-ON WHEEL RIM AND BICYCLE

CROSS-REFERENCE TO RELATED APPLICATIONS

This application claims priority from German patent application DE 10 2007 042 198, filed on Aug. 29, 2007. The entire contents of this priority application are incorporated herein by reference.

BACKGROUND OF THE INVENTION

The present invention relates to a method for producing a rim ring for a wheel rim, in particular for a wired-on wheel rim, and to a rim ring.

The invention also relates to a method for fastening spokes made of composite fibrous material to a rim ring, and to a wired-on tire rim with a rim ring and spokes made of composite fibrous material.

The invention finally also relates to a bicycle with a wired-on wheel rim.

There have been considerable developments in recent years and decades in the field of bicycle technology. One of the aims, which is of great interest in particular for professional sport, is the reduction of the overall weight of the bicycle without compromising on the stability required. Great attention is paid in particular to the manufacturing of the rims. This is because, firstly, the rims contain a significant proportion of the overall weight of the bicycle. In particular, however, they constitute an inert mass which, for example during a sprint, has to be accelerated, and therefore should be as small as possible.

In general, a distinction may be made between "tube wheel rims" and "wired-on wheel rims". Tube wheel rims essentially involve a rim with a concave outer side. A peripheral tube is adhesively bonded onto said side and therefore completes the wheel. Although particularly light rims and wheels may be produced in this manner, special knowledge is required for the production and the removal of the adhesive connection, and therefore this type of rim has not yet become very widespread and currently may be found virtually exclusively in professional sport.

The wired-on wheel rim is a rim in which rim flanges are formed radially on the outside of the outer rim profile. A stabilized edge of a tire is brought behind said rim flanges, with the stabilization preferably taking place by means of a peripheral wire. The wired-on tire is pressed with its edges against the rim flanges by means of a pressure which is applied in the space between the outer rim profile and the wired-on tire, and is thus held in its position. Since no adhesive bonding takes place, the tire may also be exchanged without special knowledge. Sometimes wired-on wheel rims are also referred to as clincher tire rims or clincher rims.

Essentially three principles may be distinguished for the manner in which the rim ring is supported on the hub: the full surface rim, the compression spoke rim and the tension spoke rim. In the case of the full surface rim, the hub is located on both sides in the center of a surface which ends in each case at the rim ring. For the compression spoke rim, use is made of stable spokes which do not buckle under compression loading and thus pass on a compression loading from the rim ring to the hub. In contrast thereto, in the case of the tension spoke rim, use is made of spokes which may buckle under compression loading. However, the tension spokes are stable under tensile loading, and therefore the hub is braced in relation to the rim ring in virtually all directions by means of the tension spokes. Since, however, the concentricity of the tension spoke rim depends on the symmetry of the stress applied, special measures have to be taken here to obtain uniform stress.

The materials preferred for use in the construction of rims essentially include metals, in particular aluminum, plastics and composite fibrous materials, in particular carbon. Rims made of metal may be manufactured at particularly reasonable cost, but a relatively high weight has to be accepted. Plastic rims with compression spokes may be produced relatively simply by die casting, see, for example, U.S. Pat. No. 5,184,874, but require a relatively large amount of material with a required stability and provide only limited riding comfort.

Nowadays, the best results with regard to weight and stability may be obtained by means of rims made of composite fibers. Composite fibrous materials are materials with a fibrous basic material which is deformable and may produce a fixed bond only when a matrix, in particular a resin, if appropriate, with a hardener, is added or activated. In particular, carbon should be mentioned here because the carbon fiber used is particularly light and stable. A rim of this type with tension spokes can be seen, for example, in DE 44 25 592 A1. Finally, it should be pointed out that wired-on tires with a rim ring made of composite fiber are also available, see EP 1 231 077 A2, the content of which is incorporated herein by reference in its entirety.

Although the prior art shows weight reduction possibilities without putting the minimal stability required at risk, there still continues to be a lack of a rim which may be produced in a favorable manner, in particular a wired-on tire rim for target groups outside professional sport, which rim has only a low weight and, in particular when tension spokes are used, does not need any complicated adjustment mechanisms in order to ensure the centricity of the hub relative to the rim ring.

SUMMARY OF THE INVENTION

Against this background, it is an object of the present invention to provide a method for producing a rim ring for a wheel rim having composite fibrous materials, with which a wheel rim of low weight and good stability may be produced, and of providing a rim ring which has a low weight and good stability.

According to one aspect of the invention, there is provided a method for producing a rim ring for a wheel rim, in particular for a wired-on wheel rim, comprising the following steps: providing an outer rim profile made of hardened composite fibrous material, providing a shaping plastic element, providing at least one top layer made of composite fibrous material, inserting the plastic shaping element radially within the outer rim profile, and positioning the top layer relative to the plastic shaping element and to the outer rim profile such that at least part of the top layer extends from the plastic shaping element onto the outside of the outer rim profile.

According to a further aspect of the invention, there is provided a rim ring with an outer rim profile made of composite fibrous material, on which rim flanges made of composite fibrous material are formed, with a plastic shaping element which is arranged radially within the outer rim profile, and with at least one top layer made of composite fibrous material, the top layer extending at least partially from the plastic shaping element onto the outer side of the outer rim profile.

An outer rim profile made of a hardened composite fibrous material may be used for manufacturing the rim ring. The outer rim profile may be partially hardened or already fully hardened. The only crucial aspect is that the outer rim profile has sufficient stability such that the following steps may be carried out. The outer rim profile is preferably already substantially fully hardened. In order to construct the rim ring, a plastic shaping element is provided and, in interaction with the outer rim profile and the top layers, will form the body of the rim ring. The plastic is preferably a foamed plastic, in particular a foam, which has a relatively low specific density and at the same time is sufficiently stable.

Furthermore, at least one top layer made of a composite fibrous material is provided and, together with the outer rim profile, will constitute the composite fibrous material structure of the rim ring. In this case, the top layer is preferably designed in such a manner that it may bear on both sides of the rim ring against the plastic shaping element and outer rim profile. In addition, two (or more) top layers may be provided which are each positioned on the sides of the rim ring.

The production of the outer rim profile from hardened composite fibrous material takes place as is known from the prior art for the production of molded objects from composite fibrous material. For this purpose, a correspondingly shaped mould is provided, customarily comprising a plurality of molded parts, into which composite fibers, in particular composite fiber mats, are placed. The matrix required may be brushed on or is already embedded between the fibers when preimpregnated composite fibers ("prepreg", preimpregnated fiber) are used. There is a certain time required for the hardening process, which is usually accelerated by heating the mould, after the mould is closed.

The plastic shaping element is then inserted into the outer rim profile, to be precise radially within the outer rim profile. Terms such as "radially on the inside" or "radially on the outside" are to be understood, for the purpose of uniform designation and better comprehension, to the effect that the center of the rim ring is understood to be a center point and that various elements of the rim ring are arranged at different radii relative to said center point.

When the plastic shaping element is inserted, top layers are positioned on the plastic shaping element and the outer rim profile in such a manner that at least part of the top layers extends from the plastic shaping element onto the outside of the outer rim profile. As a result, during the further proceedings, in a manner similar to adhesively bonding together two pieces of paper with an adhesive strip, a connection is produced, the connection spanning at least part of the outer rim profile and at least part of the shaping plastic element.

The stability of the rim ring is obtained only when the top layers are also hardened. However, it is conceivable for further working steps to be carried out on the rim ring before such hardening takes place, and for the hardening of the top layers to be carried out only at a later time in conjunction with the hardening of other elements.

The method may in principle be used both for the rim ring of a tube wheel rim and of a wired-on wheel rim. If a wired-on wheel rim is to be produced, an outer rim profile is selected which either already has rim flanges or is shaped in such a manner that rim flanges may be made therefrom at a later time, for example by sawing, grinding or milling. However, particular advantages in the use of this method are found particularly in regard to wired-on wheel rims, and therefore explanations below relate to a wired-on wheel rim, but many aspects thereof may also be transferred to a tube wheel rim.

The rim ring which may be produced by means of the method described has a low weight, and therefore, in addition to the layers which are used in the outer rim profile, only the top layers are required as further layers. Although it is conceivable in principle to insert additional layers for further stabilization during production, tests have shown that good stability is achieved even without further layers.

One of the particular aspects which makes a light rim possible with good stability is the use of the plastic shaping element which is designed in particular as a foam core. Within the context of the invention, it has mainly turned out that, when a foam of high stability is used, the top layers may be of relatively thin design, since, owing to the support provided by the shaping plastic element, they do not have any tendency to bulge under load. In this case, it has been surprising in particular that, despite the weight of the foam core, a weight saving may be obtained overall by means of the thinner top layers. This advantage will be further reinforced with continuing development in the chemical industry which is producing evermore stable foams of identical or lower weight.

At this point it should be mentioned that the method steps mentioned constitute the steps which take place overall during the production of the rim ring. However, a fixed sequence is not prescribed by the listing of the method steps. If, during production, the operation is carried out, for example, with a mould which is accessible from the top, then, during production, preferably first of all the top layer for one side of the rim is inserted, then the outer rim profile and the shaping plastic element, and finally the top layer for the second side of the rim.

The top layers are preferably placed on and positioned in unhardened form, since a particularly good connection may be obtained in this manner during a subsequent hardening process.

It should also be pointed out that not all of the composite fibrous material elements of the resulting rim ring or of the resulting wired-on wheel rim have to be manufactured from the same composite fibrous material. On the contrary, it is also possible to use different types of composite fibrous material or different subgroups of a certain composite fibrous material as long as a good bond and sufficient stability are ensured.

In one refinement of the invention, the top layers are hardened.

This may provide a stable rim ring with a fixed bond to the outer rim profile. The hardening is carried out in particular after the top layers are positioned relative to the plastic shaping element and to the outer rim profile unless further steps during the manufacturing of the rim ring or of the wheel rim may preferably be carried out before said hardening operation.

In a further refinement, the top layers are applied in such a manner that the top layers extend onto a section of rim flanges which are formed on the outer rim profile.

In this manner, a particularly good connection to the outer rim profile is obtained, and the outer rim profile is therefore integrated particularly well into the rim ring.

In a further refinement of the invention, the section is the radially outwardly directed surface of the rim flanges.

This permits a further improvement in the fastening of the top layers and in the fastening of the outer rim profile in the rim ring. The joining area of the top layer to the outer rim profile may be increased by the top layers extending onto the rim flanges.

In a further refinement of the invention, before insertion, the plastic shaping element is matched to the radially inner contour of the outer rim profile.

The plastic shaping element may therefore be applied particularly uniformly to the outer rim profile. Thus, no cavities remain in the cross section of the rim. Also, it is not required to provide additional filling material in order to fill the cross section of the rim.

In a further refinement of the invention, before insertion, the plastic shaping element is encased at least in some regions.

In this manner, additional stabilization of the plastic shaping element may be obtained. This also provides a simple possibility of increasing the strength of the composite fibrous material in the region of the plastic shaping element in comparison to the region of the outer rim profile, in particular of the rim flanges.

In a further refinement of the invention, the plastic shaping element is removed after the top layer has hardened.

Although the plastic shaping element is currently understood as making a considerable contribution to the stability of the rim ring, removal of the plastic shaping element after the top layers have hardened is also conceivable. This is because the plastic shaping element at this time has already fulfilled its function as a shaping element and, if top layers are of sufficiently thick design, may be removed, for example by feeding in a chemical solvent and washing it out therewith.

In a further refinement of the invention, a radially outer contour of the plastic shaping element is of concave design.

The plastic shaping element may thereby be matched particularly well to the outer rim profile when the latter is preferably shaped convexly, i.e. in the direction of the center point of the rim ring.

In a further refinement of the invention, the plastic shaping element bears directly against the outer rim profile.

Although it is possible in principle to insert intermediate layers, such as, for example, a separating film or an additional composite fibrous material layer, between the plastic shaping element and the outer rim profile, it is possible owing to the invention not to provide any layer between the plastic shaping element and the outer rim profile.

It is a further object of the present invention to provide a method for fastening spokes, in particular tension spokes, made of composite fibrous material to a rim ring, which method may be realized in a favorable manner and results in a stable fastening of the spokes, the fastening no longer requiring re-adjustment of the centricity, and to provide a wired-on wheel rim with a rim ring to which spokes are fastened in a particularly stable manner making re-stretching with regard to the centricity superfluous.

According to yet a further aspect of the invention, there is provided a method for fastening spokes, in particular tension spokes, made of composite fibrous material to a rim ring, comprising the following steps: providing a rim ring, providing spokes made of composite fibrous material, providing outer layers made of composite fibrous material, providing a center holder in the center of the rim ring, stretching the spokes from the center holder to the rim ring, and positioning the outer layers such that the spokes are at least partially covered by an outer layer in the region of the rim ring.

According to yet a further aspect of the invention, there is provided a wired-on wheel rim with a rim ring on which rim flanges made of composite fibrous material are formed, and with spokes, in particular tension spokes, made of composite fibrous material, which rest on an outer side of an outer rim profile of the rim ring.

First of all, a rim ring to which the spokes are to be fastened is provided. In this case, it is preferred for the rim ring also to be manufactured from composite fibrous material, at least in the regions in which the connection to the spokes is to be produced, in order to permit particularly good joining. The entire surface of the rim ring is preferably manufactured from composite fibrous material, with the rim ring having been produced in particular according to a previously described method for producing a rim ring.

Spokes and outer layers made of composite fibrous material are provided as further elements. Finally, a center holder which is arranged in the center of the rim ring is also provided. The center holder serves to strengthen the spokes in the region of the later hub. Although it is possible to later exchange the center holder for a hub, it is preferred that the center holder already constitutes part or a plurality of parts of the later hub, or that a hub is used as the center holder.

The spokes are then first of all stretched from the center holder to the rim ring. In this case, it is not required for each individual spoke to be designed as an element which is separated physically from all of the other spokes. Thus, in a refinement of the method, it is preferred to form two spokes by a composite fibrous material element being guided from the rim ring to the center holder and from the center holder back to the rim ring. Furthermore, it is preferred if a multiplicity of spokes is formed by a composite fibrous material element being guided to and fro in an alternating manner between rim ring and center holder.

When the spokes are located in the desired position, outer layers are positioned in such a manner that the spokes are at least partially covered by an outer layer in the region of the rim ring. During the subsequent hardening operation, the outer layers serve to connect the spokes particularly fixedly to the rim ring. In addition, a slight difference in level between the regions of the rim ring without spokes and regions with spokes may be compensated for by means of the outer layers. Further, during the hardening operation, use is preferably made of a sufficient quantity of a matrix which may act in a level-regulating manner and fills the regions to a lower level, i.e. between the spokes. The outer layers thereby obtain a particularly smooth surface.

The stability of the spoke fastening is obtained only by means of a hardening operation. However, it may be advantageous to carry out further working steps before said hardening operation and only then to harden all of the elements in their entirety.

In one refinement of the invention, rim ring, spokes and outer layers are hardened.

This produces the desired strength for the fastening of the spokes to the rim ring. The hardening is preferably carried out after the outer layers are positioned, unless other working steps which preferably take place before said hardening operation are to be carried out.

In a further refinement of the invention, the spokes are hardened before the stretching operation.

This simplifies the manufacturing process. If the spokes are already hardened or pre-hardened, the hardening of the spokes no longer has to be taken into consideration during the subsequent processing, or it may be carried out in a simplified manner. In addition, the spokes may be inserted already in the desired shape such that subsequent shaping is unnecessary.

In a further refinement of the invention, a region of the spokes that is positioned between the rim ring and the outer layers is initially hardened to a lesser extent or remains unhardened.

Owing to the fact that the spokes are hardened to a lesser extent or are unhardened in the region between the rim ring and the outer layers, a particularly secure fastening of the spokes to the rim ring may be obtained during the subsequent hardening operation.

In a further refinement of the invention, the spokes are stretched between an outer holder and the center holder, with the outer holder being arranged outside the rim ring.

The spokes may thereby be stretched particularly well. The course of the spokes from the center holder to the outer holder, in particular in the region of the rim ring, may be achieved by corresponding shaping and/or retaining elements.

In a further refinement of the invention, the spokes rest at least on one section of the rim flanges.

This permits an even better fastening of the spokes to the rim ring, in particular to the outer rim profile, since the resting surface of the spoke on the rim ring is enlarged.

In a further refinement of the invention, the section is the outwardly directed surface of the rim flanges.

The resting surface is thereby in turn also enlarged such that the fastening of the spokes to the rim ring is further improved.

It should be pointed out that the spokes do not have to rest directly on the outer rim profile or the rim flanges. On the contrary, it is likewise possible, if the outer rim profile is already coated with a layer, in particular the top layer, for the spokes to rest on the outer rim profile via the layer or layers lying in between.

It is yet a further object of the invention to provide a bicycle with a wired-on wheel rim which is distinguished by a low weight with good stability.

According to yet a further aspect of the invention, there is provided a bicycle which has a rim ring or a wired-on wheel rim which has been produced according to the previously described method or has a previously described rim ring or wired-on wheel rim.

It goes without saying that the features mentioned above and those which have yet to be explained below may be used not only in the respectively stated combination but also in different combinations or on their own without departing from the scope of the present invention. This includes in particular the fact that the methods for producing the rim ring and for fastening spokes may very advantageously be combined with each other.

BRIEF DESCRIPTION OF THE DRAWINGS

Exemplary embodiments of the invention are illustrated in more detail in the drawing and are explained in more detail in the description below. In the drawing.

DESCRIPTION OF PREFERRED EMBODIMENTS

Figure 1:
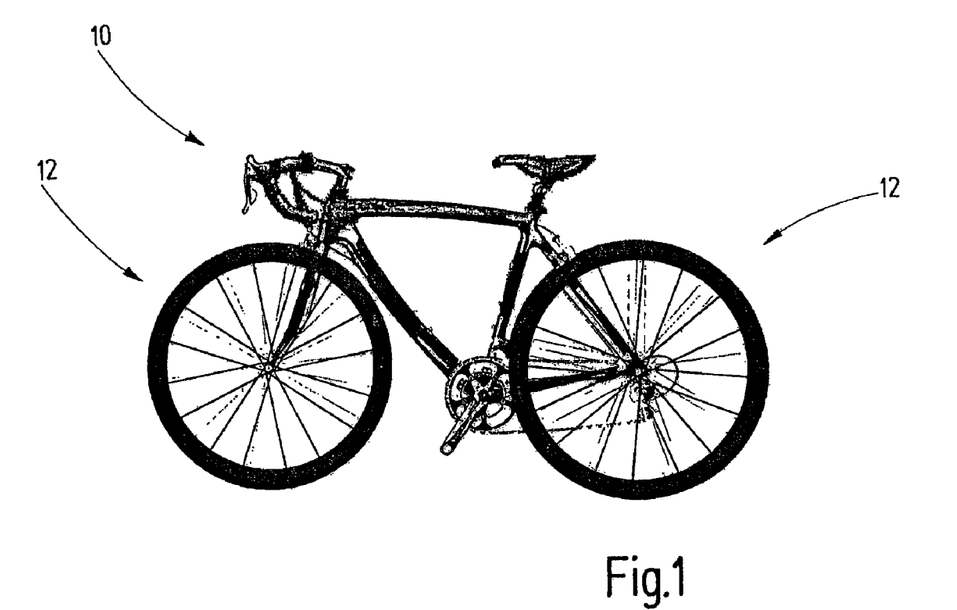
FIG. 1 shows a bicycle with wired-on wheel rims.

FIG. 1 shows a bicycle 10 with two wheel rims 12.

Figure 2:
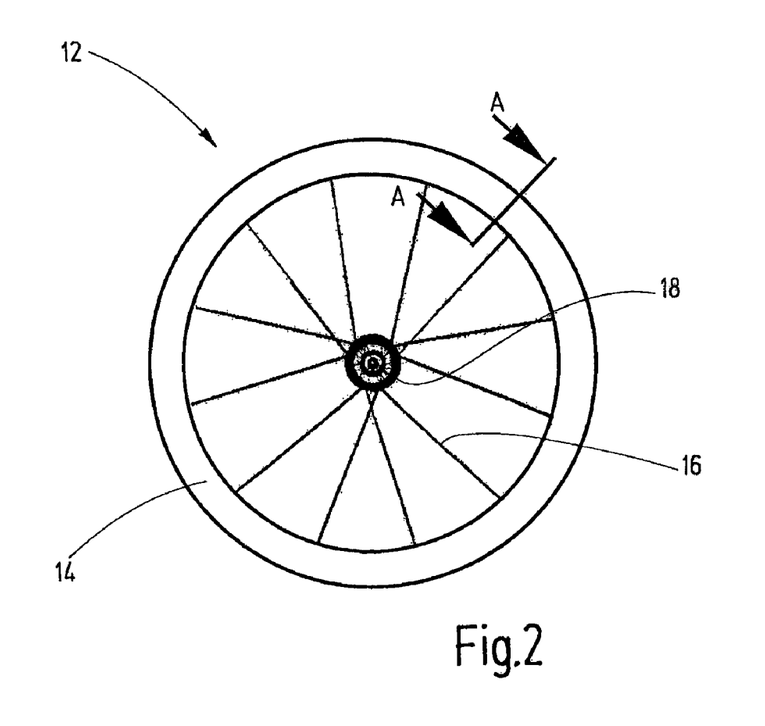
FIG. 2 shows a wired-on wheel rim with spokes.

FIG. 2 shows a wired-on wheel rim 12 with a rim ring 14, a multiplicity of spokes 16 and a hub 18. A section line A-A is shown along the rim ring 14 in order to clarify how the cross section through the rim 12 and in particular through the rim ring 14 is understood.

Figure 3:
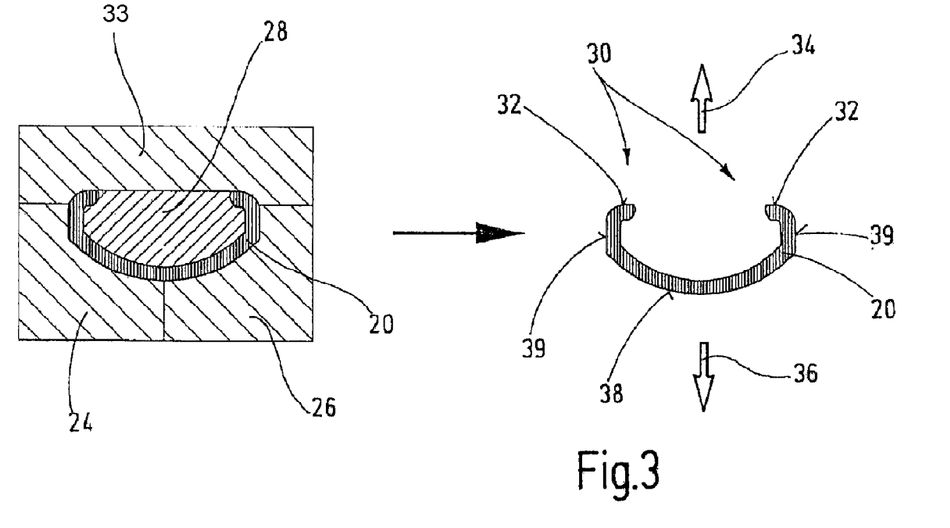
FIG. 3 shows the simplified illustration of the production of an outer rim profile.

FIG. 3 shows, in a highly simplified illustration, how the outer rim profile 20 may be produced. A sleeve 33, a left mould half 24 and a right mould half 26, into which composite fibers for the outer rim profile 20 are inserted, may be seen on the left side. A pressure-exerting component 28 with which the composite fibrous material for the outer rim profile 20 is pressed both from the inside and from the outside and is kept in shape is also shown. The manufacturing procedure is sufficiently known, for example from EP 1 231 077 A2 mentioned at the beginning, and will therefore not be explained further.

The result of the production is shown on the right side of FIG. 3. It is an outer rim profile 20 with rim flanges 30 which are formed on the outer rim profile 20. In this case, each of the rim flanges 30 has a radially outwardly directed surface 32. The orientation "radially outwards" is symbolized by means of the arrow 34. The orientation "radially inwards" is symbolized by the arrow 36.

It may be preferable for the outer rim profile 20 to be substantially fully hardened. Nevertheless, it is pointed out that it is also possible to merely partially harden the outer rim profile 20 if it is then already of sufficient stability for subsequent manufacturing steps.

The outer rim profile 20 has a radially inner contour 38 and furthermore has two outer sides 39, i.e. the sides which point essentially in the lateral direction.

FIG. 4 shows, again in cross section, the provision of a plastic shaping element 40 and the insertion of the plastic shaping element 40 radially within the outer rim profile 20.

Figure 4:
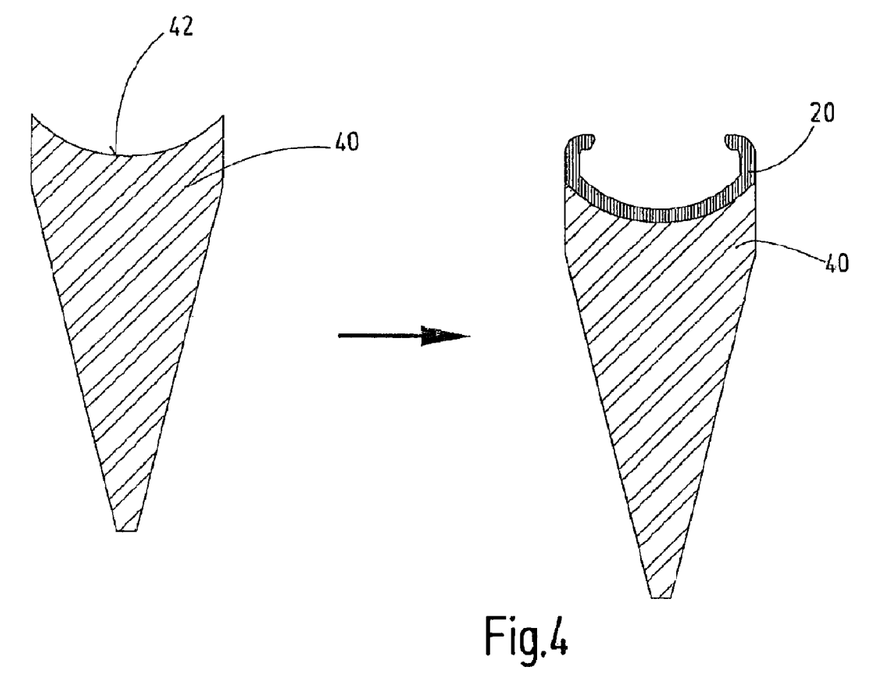
FIG. 4 shows the positioning of the shaping plastic element.

As may readily be seen in particular from the left side of FIG. 4, a radially outer contour 42 of the plastic shaping element 40 is of concave design. As may be seen from the right side of FIG. 4, the plastic shaping element 40 therefore bears directly against the outer rim profile 20.

Figure 5:
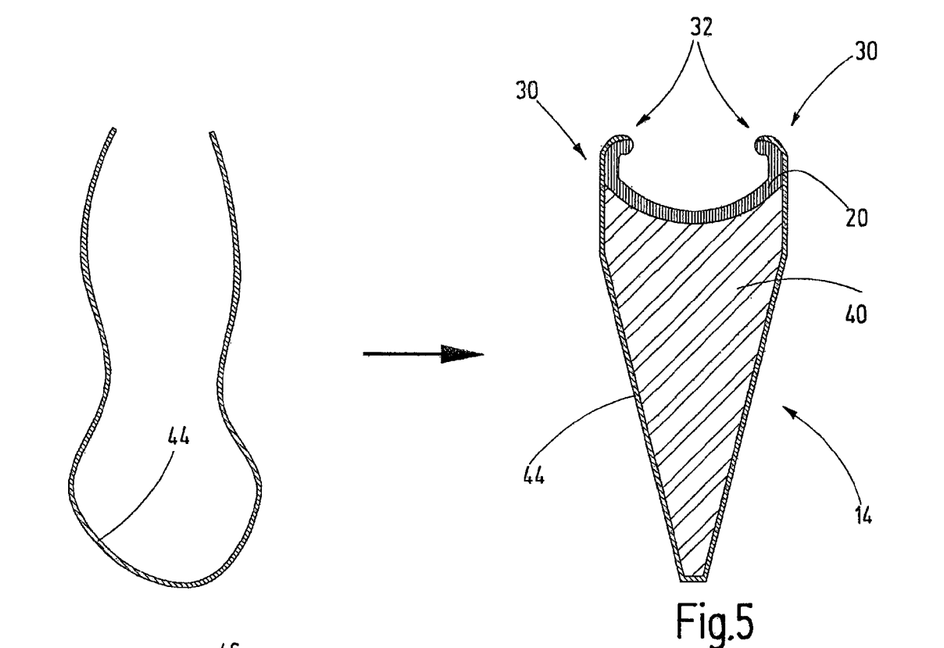
FIG. 5 shows the positioning of the top layer.

FIG. 5 shows, again in cross section, on the left side a top layer 44 made of composite fibrous material. The top layer 44 is shown by curved lines in order to indicate that the top layer 44 is unhardened before being positioned. The top layer 44 is positioned relative to the plastic shaping element 40 and to the outer rim profile 20 in such a manner that at least part of the top layer 44, here the entire top layer 44, extends from the plastic shaping element 40 onto the outer side of the outer rim profile 20. In this case, it is in particular such that the top layer 44 extends onto the rim flanges 30, specifically onto the radially outwardly directed surface 32. Particularly good joining and fastening are thereby obtained.

Figure 6A:
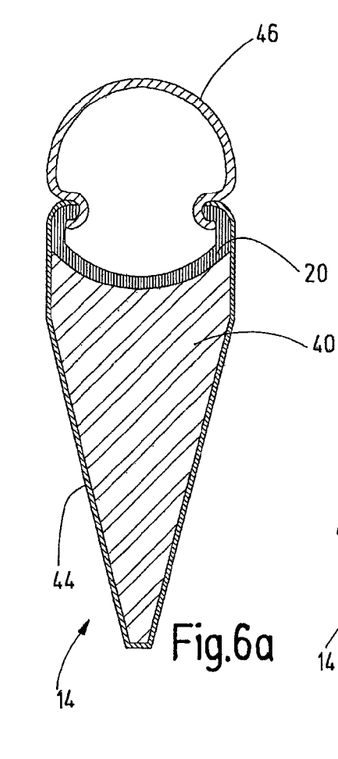
FIG. 6a shows a partial cross sectional view along line A-A of FIG. 2 of a first embodiment of a rim ring with a tire casing pulled onto it.

FIG. 6a shows a first embodiment of the rim ring 14 with a tire casing 46 pulled onto it produced from the steps explained up to now. It may be seen that, in this embodiment, no separating element is arranged between the outer rim profile 20 and the plastic shaping element 40. Accordingly, no fibers of the top layer run in the region between the outer rim profile 20 and plastic shaping element 40 either.

Figures 6B, 6C:
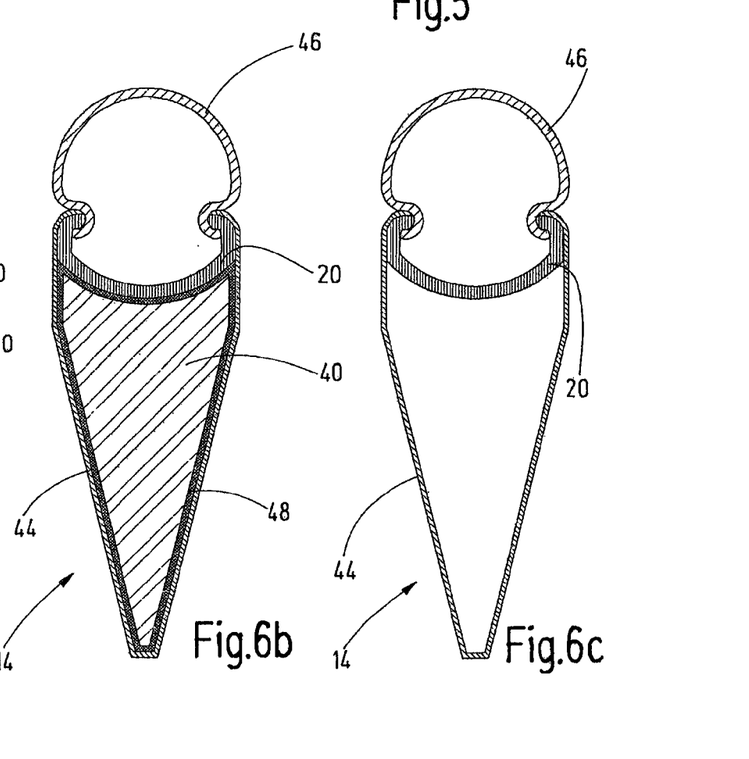
FIG. 6b shows a partial cross sectional view along line A-A of FIG. 2 of a second embodiment of a rim ring with a tire casing pulled onto it.
FIG. 6c shows a partial cross sectional view along line A-A of FIG. 2 of a third embodiment of a rim ring with a tire casing pulled onto it.
Figure 6D:
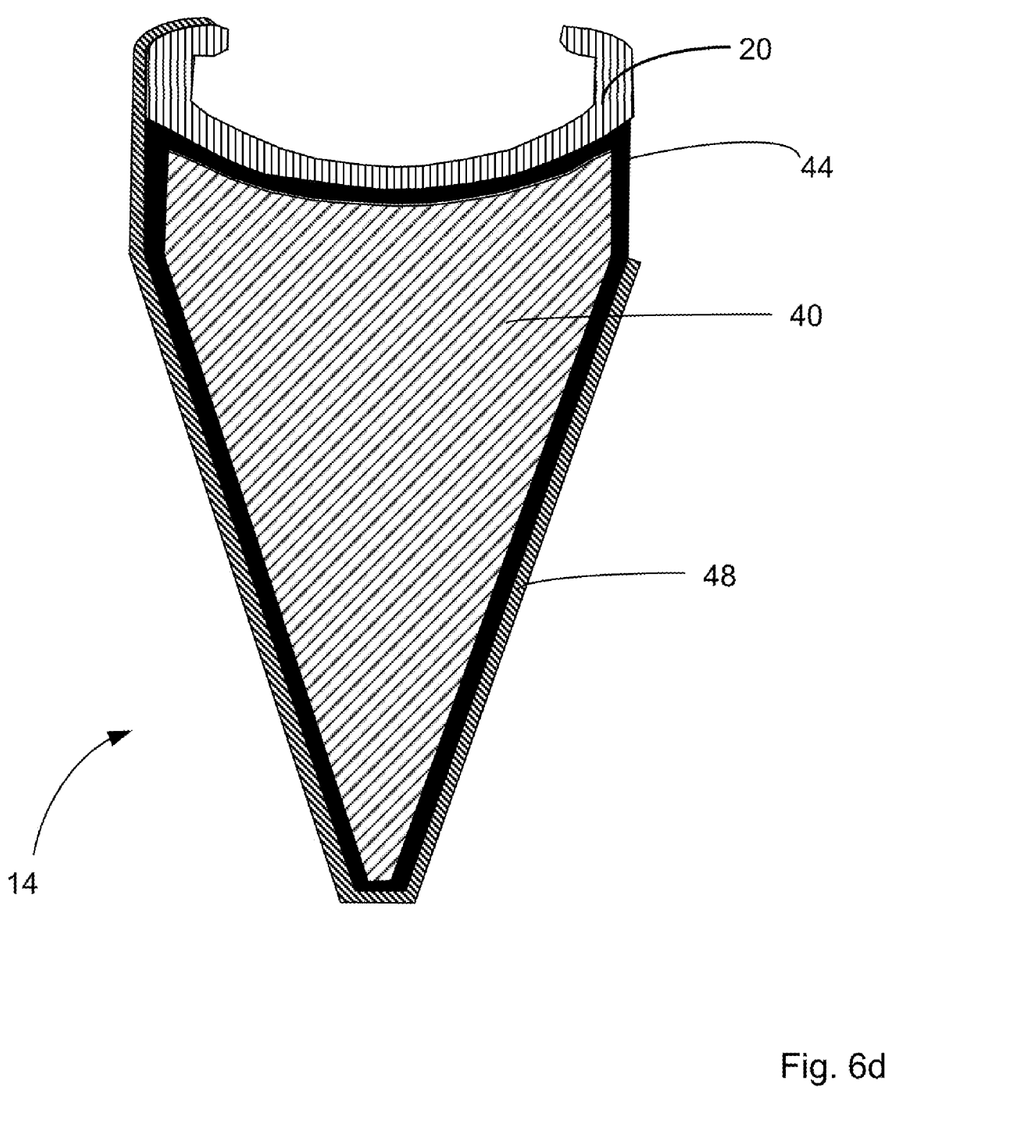
FIG. 6d shows a partial cross sectional view along line A-A of FIG. 2 of a fourth embodiment of a rim ring with a tire casing pulled onto it.

FIG. 6b shows, in cross section, a second exemplary embodiment of the rim ring 14, with the plastic shaping element 40 being surrounded here by a casing 48. It is also possible to apply the casing 48 merely to some regions of the plastic shaping element 40 as is shown in FIG. 6d.

FIG. 6c shows, in cross section, an exemplary embodiment of the rim ring 14, in which the plastic shaping element 40 has finally been removed.

The method for producing a rim ring 14 has therefore been described. In particular in the preferred embodiment according to FIG. 6a, the rim ring 14 has a low weight with good stability.

Since the method for producing a rim ring 14 for a wheel rim has been explained, the method for fastening spokes 16 made of a composite fibrous material to a rim ring 14 will now be illustrated. In this case, use is preferably made of tension spokes, but also compression spokes, in particular stable, tubular compression spokes, may be used as described below.

Figure 7:
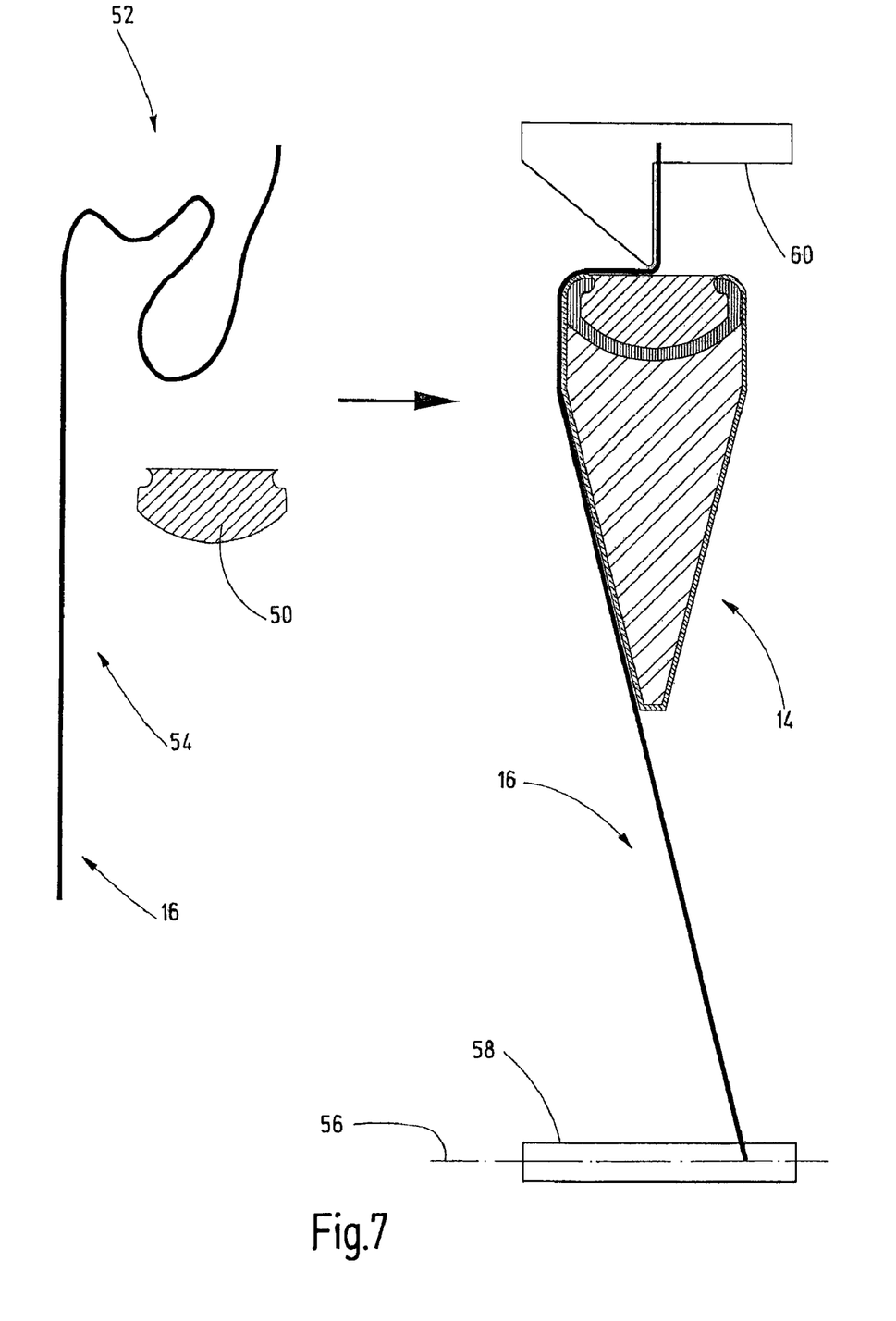
FIG. 7 shows the cross section through a rim ring during the fastening of a tension spoke.

FIG. 7 shows, on the left side, the composite fibrous material for a spoke 16 and a pressure-exerting component 50. The spoke 16, which is representative here by way of example of each of the spokes 16, has a region 52 which is subsequently positioned between the rim ring 14 and outer layers. The region 52 is shown with curved lines in order to symbolize that the region 52 is hardened to a lesser extent or, preferably, is unhardened, whereas the rectilinear region 54 symbolizes that the spoke 16 is hardened here to a greater extent, in particular is fully hardened.

However, it is also possible already to produce the spokes 16 and to fully harden it with the shape which it will have subsequently (as shown on the right side of FIG. 7) before it is inserted. The further processing and the required shaping, if required, cannot be simplified as a result.

As may be seen on the right side of FIG. 7, the pressure-exerting component 50 is inserted into the rim ring 14. However, this is a highly simplified illustration, since the use of pressure-exerting components, whether comprising a plurality of molded elements or by means of a silicone insert which is pressurized, is well known, see EP 1 231 077 A2, mentioned at the beginning.

A center holder 58 is provided in the center 56 of the rim ring 14. An outer holder 60 is arranged outside the rim ring 14. As may already be seen from FIG. 7, the spoke 16 is stretched between the outer holder 60 and the center holder 58. In this case, it is ensured, by means of a suitable shape of the outer holder 60, that the spoke 16 runs along the surface of the rim ring 14.

Figure 8:
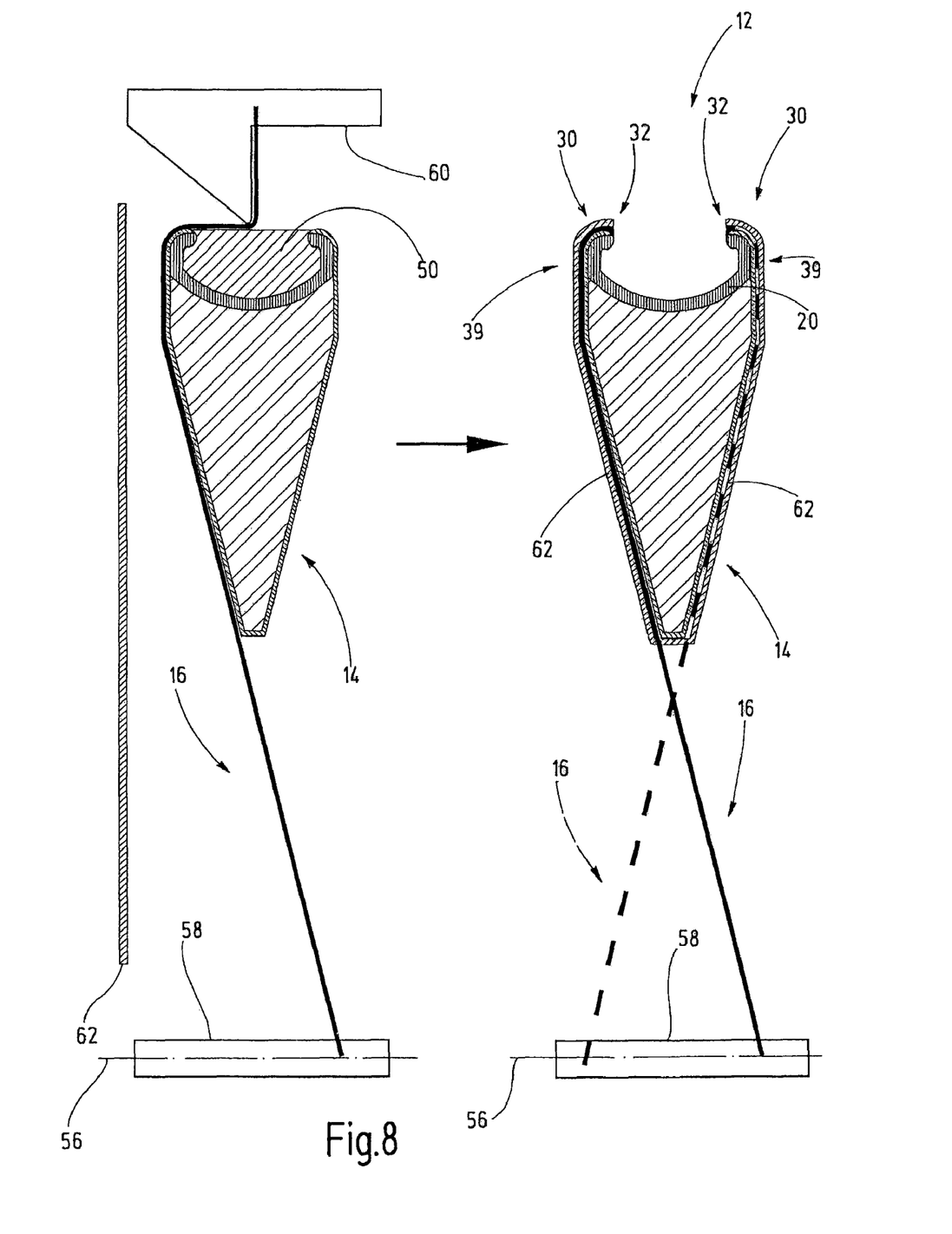
FIG. 8 shows the cross section of the rim ring during the application of the outer layers and after the interior of the outer rim profile has been exposed.

The continuation of the method is shown in FIG. 8 in which the provision of an outer layer 62 is shown on the left side. As may be seen on the right side of FIG. 8, the outer layer 62 is placed onto the rim ring 14 with the spoke such that the spoke 16 is at least partially, here fully, covered by the outer layer 62 in the region of the rim ring 14.

In addition, it is also shown on the right side of FIG. 8 how the interaction of the spokes 16 on both sides of the rim ring 14 functions (see spokes 16 shown by dashed lines). It may furthermore be seen that the pressure-exerting component 50 has been removed. It should be pointed out that the rim flanges 30 do not have to be formed from the outset. On the contrary, it is possible also not to form the rim flanges 30 until this particular time.

Finally, a hardening operation is carried out in order to bring about a fixed bond between the rim ring 14, the spokes 16 and the outer layer 62.

The resulting wired-on wheel rim 12 has a low weight and good stability. The spokes 16 are fastened in such a manner that no subsequent stretching is required. In addition, the wired-on wheel rim 12 is favorable to manufacture and is therefore attractive in terms of price to a larger public. The technical teachings imparted here may be applied both to a symmetrical and to an asymmetrical cross section of the rim.

The invention claimed is:

1. A method for producing a rim ring for a wheel rim, comprising the following steps:
providing an outer rim profile made of hardened composite fibrous material including rim flanges configured to engage outer edges of a tire to hold the tire on the wheel rim,
providing a plastic shaping element,
providing at least one top layer made of composite fibrous material,
positioning an outer portion of said plastic shaping element proximate to a portion of said outer rim profile opposite said rim flanges, and
positioning said top layer relative to said plastic shaping element and to said outer rim profile such that at least part of said top layer extends from said plastic shaping element onto an outside of said outer rim profile wherein a portion of said top layer on said outer rim profile can extend up to a radially outer most peripheral portion of at least one of the rim flanges of said outer rim profile.

2. The method according to claim 1, further comprising the step of hardening of said top layer.

3. The method according to claim 1, wherein said top layer is applied in such a manner that said top layer extends onto a section of rim flanges which are formed on said outer rim profile.

4. The method according to claim 3, wherein said section is a radially outwardly directed surface of said rim flanges.

5. The method according to claim 1, further comprising the step of, before insertion, matching said plastic shaping element to a radially inner contour of said outer rim profile.

6. The method according to claim 1, further comprising the step of, before insertion, encasing said plastic shaping element at least in some regions by a casing.

7. The method according to claim 1, further comprising the step of removing said plastic shaping element after said top layer has hardened.

8. A rim ring for a wheel rim prepared by a process comprising the steps of
providing an outer rim profile made of hardened composite fibrous material including rim flanges configured to engage outer edges of a tire to hold the tire on the wheel rim,
providing a plastic shaping element,
providing at least one to layer made of composite fibrous material,
positioning a portion of said plastic shaping element proximate to a portion of said outer rim profile opposite said rim flanges, and
positioning said top layer relative to said plastic shaping element and to said outer rim profile such that at least part of said top layer extends from said plastic shaping element onto an outside of said outer rim profile wherein a portion of said top layer on said outer rim profile can extend up to a radially outer most peripheral portion of at least one of the rim flanges of said outer rim profile.

9. The rim ring according to claim 8, wherein said top layer extends onto both said rim flanges.

10. The rim ring according to claim 9, wherein said top layer extends onto a radially outer most peripheral portion of both of said rim flanges.

11. The rim ring according to claim 8, wherein a radially outer contour of said plastic shaping element substantially corresponds to a radially inner contour of said outer rim profile.

12. The rim ring according to claim 8, wherein a radially outer contour of said plastic shaping element is of concave design.

13. The rim ring according to claim 8, wherein said plastic shaping element bears directly against said outer rim profile.

14. A method for fastening spokes made of composite fibrous material to a rim ring, comprising the following steps:
- providing a rim ring,
- providing spokes made of composite fibrous material,
- providing at least one outer layer made of composite fibrous material,
- providing a center holder,
- stretching of said spokes from said center holder to said rim ring,
- positioning said outer layer such that said spokes are at least partially covered by said outer layer in a region of said rim ring; and
- stretching said spokes between an outer holder and said center holder, with said outer holder being arranged outside said rim ring.

15. The method according to claim 14, further comprising a step of hardening of said rim ring, said spokes and said outer layer.

16. The method according to claim 14, further comprising a step of hardening of said spokes before the step of stretching.

17. A wired-on wheel rim with a rim ring on which rim flanges made of composite fibrous material are formed wherein the rim flanges are configured to engage outer edges of a tire to hold the tire on the wheel rim, and with spokes made of composite fibrous material, which rest on an outer side of an outer rim profile wherein a portion of the spokes resting on the outer side of the outer rim profile can extend up to a radially outer most peripheral portion of the rim flanges of said rim ring.

18. The wired-on wheel rim according to claim 17, wherein said spokes lie at least on a section of said rim flanges.

19. The wired-on wheel rim according to claim 18, wherein said section is an outwardly directed surface of said rim flanges.

\* \* \* \* \*